(12) United States Patent
Okuda et al.

(10) Patent No.: US 7,946,711 B2
(45) Date of Patent: May 24, 2011

(54) ILLUMINATION DEVICE AND PROJECTION DISPLAY DEVICE

(75) Inventors: Michihiro Okuda, Hirakata (JP);
Shinya Matsumoto, Hirakata (JP);
Yoshihiro Yokote, Yokohama (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 511 days.

(21) Appl. No.: 12/202,468

(22) Filed: Sep. 2, 2008

(65) Prior Publication Data
US 2009/0059177 A1    Mar. 5, 2009

(30) Foreign Application Priority Data

Sep. 4, 2007    (JP) ................................. 2007-228835

(51) Int. Cl.
*G03B 21/00* (2006.01)
*G03B 21/14* (2006.01)
*G03B 21/20* (2006.01)

(52) U.S. Cl. .............................. 353/38; 353/85; 353/122

(58) Field of Classification Search .............. 353/30–31, 353/33, 38, 85, 94, 122; 362/257, 268–269; 359/623; 372/9, 26
See application file for complete search history.

(56) References Cited

U.S. PATENT DOCUMENTS

| | | | | |
|---|---|---|---|---|
| 5,253,110 A * | 10/1993 | Ichihara et al. | ............... | 359/619 |
| 6,084,626 A * | 7/2000 | Ramanujan et al. | .......... | 347/239 |
| 7,538,948 B2 * | 5/2009 | Muenz et al. | ................. | 359/618 |
| 7,789,517 B2 * | 9/2010 | Lee | .................................. | 353/94 |
| 2009/0257106 A1 * | 10/2009 | Tan et al. | ....................... | 359/279 |

FOREIGN PATENT DOCUMENTS

JP    2005-331908 A    12/2005
WO    99/49358 A1    9/1999

* cited by examiner

*Primary Examiner* — Georgia Y Epps
*Assistant Examiner* — Jori S Reilly-Diakun
(74) *Attorney, Agent, or Firm* — Marvin A. Motsenbocker; Mots Law, PLLC (57) ABSTRACT

An illumination device includes a light source part for emitting light with an intensity distribution approximately uniform in a first direction and a fly-eye lens into which the light is entered. The light source part and the fly-eye lens are arranged such that the first direction is inclined with respect to vertical and horizontal directions of arrangement of lens cells in the fly-eye lens. Since illumination light is entered into the fly-eye lens in a state of inclining with respect to the fly-eye lens, the number of superimposition patterns on the fly-eye lens is increased and illuminance non-uniformity in illumination light is suppressed.

8 Claims, 9 Drawing Sheets

ILLUMINATION DEVICE AND PROJECTION DISPLAY DEVICE

This application claims priority under 35 U.S.C. Section 119 of Japanese Patent Application No. 2007-228835 filed on Sep. 4, 2007, entitled "ILLUMINATION DEVICE AND PROJECTION DISPLAY DEVICE".

BACKGROUND OF THE INVENTION

1. Field of the Invention

The present invention relates to an illumination device and a projection display device using the same, and more particularly, is suitable for use in a case where a plurality of laser light sources are linearly arranged.

2. Disclosure of Related Art

Conventionally, in a projection display device (hereinafter, referred to as a "projector"), a lamp light source such as an ultra-high pressure mercury lamp, a metal halide lamp, or a xenon lamp has been used as an emission light source. Meanwhile, in recent years, a projector using a laser light source has been under development. A laser light source has a high level of capability to express a wide color space with high brightness and high definition, and is receiving attention as a light source for next-generation projectors.

In such a display device, the brightness of illumination light can be raised by arranging and arraying a plurality of laser light source in two dimensions. In arranging a plurality of laser light sources in such a manner, a means for reducing non-uniformity in illumination light may be utilized. For example, the means detects any laser light source having an output shortage or in an unlit state, and controls the laser light sources based on the detection results.

In general, a plurality of laser light sources are linearly aligned in such a manner as to be close to each other. In this case, an illuminance distribution of illumination light emitted from the linearly aligned laser light sources, is prone to be uniform in a direction of arrangement. Accordingly, if fly-eye lenses are arranged such that the laser light sources and fly-eye lens cells are aligned in parallel to each other, the effectiveness of illumination light superimposition by the fly-eye lenses is deteriorated, thereby causing non-uniformity in an illumination distribution of illumination light on an imager.

SUMMARY OF THE INVENTION

Accordingly, a primary object of the present invention is to suppress illuminance non-uniformity in illumination light on an imager in a smooth and effective manner.

A first aspect of the present invention relates to an illumination device. An illumination device according to the first aspect includes a light source part for emitting light with an intensity distribution approximately uniform in a first direction and a fly-eye lens into which the light is entered. The light source part and the fly-eye lens are arranged such that the first direction is inclined with respect to vertical and horizontal directions of arrangement of lens cells in the fly-eye lens.

According to the illumination device in the first aspect, since illumination light is entered into the fly-eye lens such that the first direction is inclined with respect to the vertical and horizontal arrangement directions of the lens cells, the effectiveness of illumination light superimposition by the fly-eye lens can be enhanced. Accordingly, it is possible to suppress illuminance non-uniformity in illumination light on an imager.

In the illumination device of the first aspect, the light source part may have a plurality of laser light sources arranged in the first direction. In this arrangement, when the plurality of laser light sources are mutually identical in a direction of polarization, it is possible to align illumination light on an imager in a direction of polarization. However, since a direction of arrangement of the laser light sources is inclined with respect to the arrangement directions of the fly-eye lens cells, the use of a liquid crystal panel as an imager may cause the polarization direction of illumination light to incline with respect to a correct polarization direction on the liquid crystal panel.

In this case, by providing a polarization rotation element to rotate the polarization direction so that the polarization direction of light having passed through the fly-eye lens is adapted to the imager (liquid crystal panel), it is possible to enter illumination light into the liquid crystal panel in the correct polarization direction. In this case, a half-wavelength plate can be used as a polarization rotation element.

A second aspect of the present invention relates to a projection display device. A projection display device according to the second aspect includes an illumination device having the foregoing configuration and an imager irradiated with the light superimposed by the fly-eye lens. In this case, it is possible to provide the same advantages as those provided by an illumination device having the foregoing configuration.

BRIEF DESCRIPTION OF THE DRAWINGS

The foregoing and other objects and novel features of the present invention will be more fully understood from the following description of the preferred embodiments when reference is made to the accompanying drawings.

However, the drawings are provided only for illustration and do not restrict the scope of the present invention.

DESCRIPTION OF PREFERRED EMBODIMENTS

Preferred embodiments of the present invention will now be described with reference to the drawings.

Figure 1A:
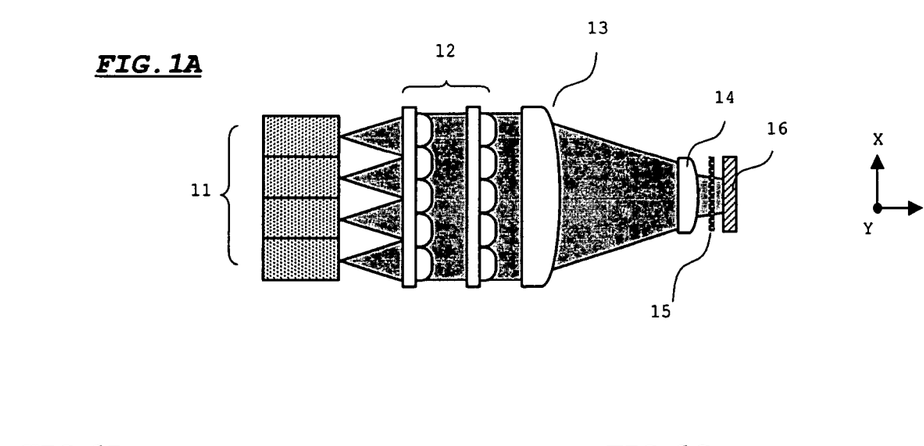
FIG. 1A shows a basic configuration of an optical system in an embodiment.

First, FIG. 1A illustrates a basic configuration of an optical system in an embodiment. In the diagram, reference numeral 11 denotes laser light sources (semiconductor lasers). This configuration has four laser light sources 11 linearly arranged and arrayed. A direction of arrangement of the laser light sources 11 is inclined at a predetermined angle with respect to an in-plane direction of an X-Y plane from a direction of an X axis in the diagram. Light emission points of these laser light sources 11 are positioned in the same plane parallel to the X-Y plane, and a direction of the longer axis of the beam (hereinafter referred to as "longer beam axis direction") is vertical to the arrangement direction of the laser light sources. Directions of polarization of laser light emitted from the laser light sources are all the same.

The beam shape of laser light emitted from the laser source 11 becomes an ellipse according to a difference in a spread angle of laser light. The longer beam axis direction means a direction in alignment with a longer axis of the ellipse.

Laser light emitted from the four laser light sources 11 is entered into a pair of fly-eye lenses 12. The fly-eye lenses 12 each have lens cells arranged in a matrix. Directions of lines of the lens cells are parallel to the X-axis direction in the diagram.

After passing through the lens cells, the laser light goes through condenser lenses 13 and 14 and a half-wavelength plate 15, and then is superimposed on an incident plane of a liquid crystal panel (imager) 16. Here, by passing through the half-wavelength plate 15, the laser light is adjusted such that the polarization direction thereof becomes appropriate for a liquid crystal panel 17.

Figure 1B:
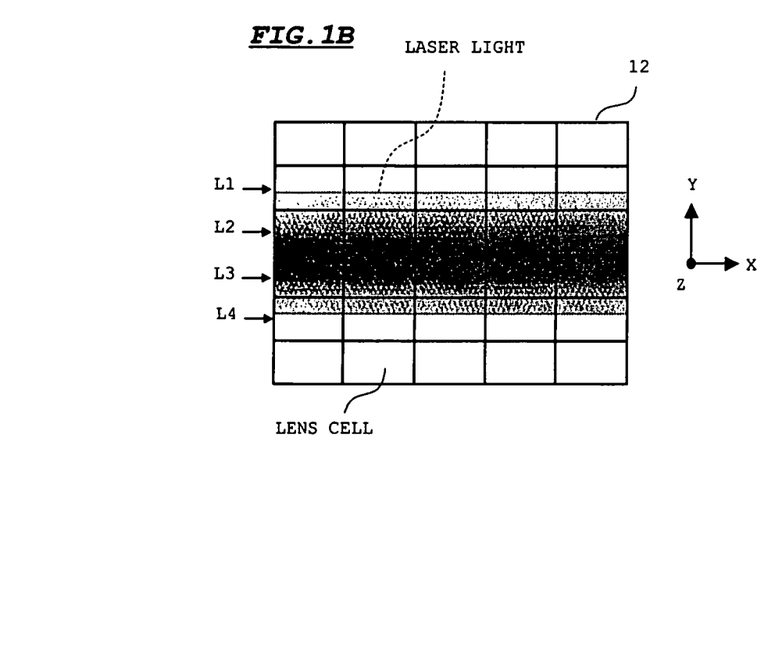
FIGS. 1B and 1C show schematically relationships between placements of laser light sources and intensity distributions of laser light on a fly-eye lens.

In this configuration, if the arrangement direction of the laser light sources 11 is parallel to the X-axis direction, an intensity distribution of laser light (hereinafter referred to as "illumination light") incident on the fly-eye lenses 12 is approximately uniform in the X-axis direction. FIG. 1B illustrates schematically an intensity distribution of illumination light incident on the fly-eye lens 12. In FIG. 1B, the intensity of the illumination light is higher with increasing proximity to black. As shown in the diagram, the intensity distribution of the illumination light is approximately uniform in the X-axis direction, and is high at a central position in a direction of a Y axis and gradually becomes lower with increasing distance from the central position in the Y-axis direction.

In this case, the illumination light is entered in almost identical intensity patterns into five lens cells in a line L1 of the fly-eye lens 12. In addition, the illumination light is also entered in almost identical intensity patterns to lens cells in lines L2, L3 and L4. Therefore, the number of patterns of illumination light superimposition by the lens cells is equal to the number of lines (L1, L2, L3 and L4) of lens cells into which the illumination light is entered. That is, the number of patterns of superimposition is four in the case shown in FIG. 1B. Accordingly, the effectiveness of light superimposition by the fly-eye lens 12 is low and thus the effectiveness of uniformization of illumination light on the liquid crystal panel 16 is decreased.

Figure 1C:
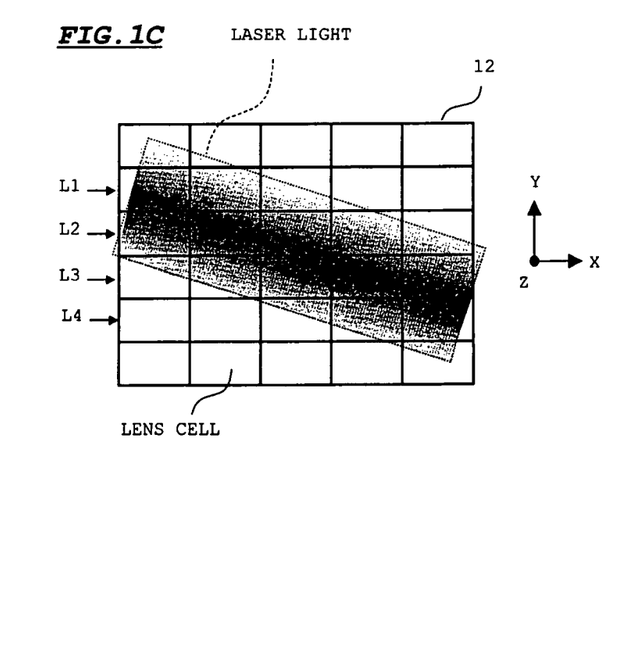

On the other hand, in this embodiment, since the arrangement direction of the laser light sources 11 is inclined at a predetermined angle from the X-axis direction as stated above, and an intensity distribution of illumination light incident on the fly-eye lens 12 becomes as shown in FIG. 1C. In this case, intensity distributions of illumination light entered into the lens cells in the lines L1, L2, L3 and L4 are different. Therefore, the number of patterns of illumination light superimposition by the lens cells is equal to the number of lens cells into which illumination light is entered. In the case of FIG. 1C, since illumination light is entered into total 20 lens cells, the number of superimposition patterns is 20.

In this embodiment, as stated above, since the arrangement direction of the laser light sources 11 is inclined at a predetermined angle in an in-plane direction of a Y-Z plane from the X-axis direction, the number of patterns of laser light superimposition on the incident plane of the liquid crystal panel 16 is significantly increased, as compared with the case where the laser light sources 11 are arranged in parallel to the X-axis direction. As a result, it is possible to significantly enhance the effectiveness of illumination light superimposition by the fly-eye lenses 12, thereby suppressing illuminance non-uniformity in illumination light.

SIMULATION

The following is a description on a simulation of uniformization of illumination light in this embodiment.

Figure 2A:
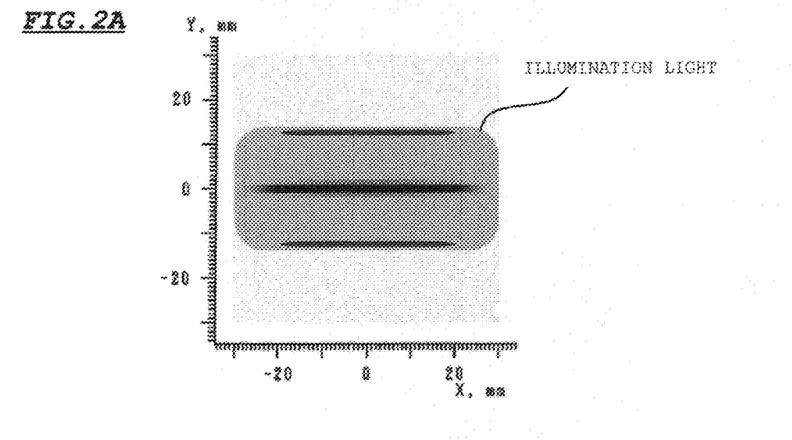
FIGS. 2A to 2C show photographs of intensity distributions of laser light that are used in a simulation of the embodiment.

In this simulation, the intensity distribution shown in FIG. 2A was used as an intensity distribution of illumination light entered from the laser light sources 11 to the fly-eye lenses 12. In FIG. 2A, the intensity of illumination light becomes higher with increasing proximity to black.

Figure 2B:
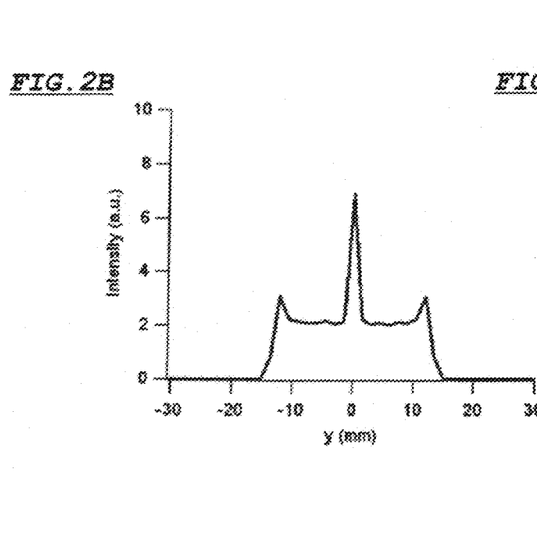
Figure 2C:
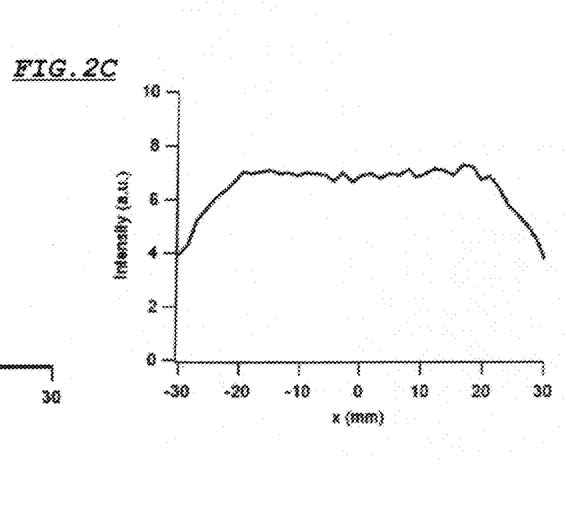

FIG. 2B illustrates an intensity distribution of illumination light in a direction of a vertical axis (y axis), at a position of 0 mm on a horizontal axis (x axis) shown in FIG. 2A (central position in a direction of the horizontal axis). FIG. 2C illustrates an intensity distribution of illumination light in the direction of the horizontal axis (x axis), at a position of 0 mm on the vertical axis (y axis) shown in FIG. 2A (central position in the direction of the vertical axis). In addition, an intensity distribution of illumination light in the direction of the horizontal axis at any position other than the position of 0 mm on the vertical axis, indicates a tendency similar to that shown in FIG. 2C. That is, an intensity distribution in the horizontal axis direction is approximately uniform within a range of $-20$ (mm)$\leq X \leq 20$ (mm), at not only the position of 0 mm on the vertical axis but also any other position on the vertical axis.

In this simulation, illumination light with such intensity distributions was rotated in the in-plane direction of the X-Y plane shown in FIG. 1A with respect to the fly-eye lenses 12, and illuminance non-uniformity in the illumination light on the liquid crystal panel 16 was determined at each rotated position by an optical simulation. A basic configuration of the optical system in this simulation was the same as that shown in FIG. 1A.

A size of one lens cell in the fly-eye lens 12 was set to 2.80 mm long by 3.64 mm wide, and the total number of lens cells was set to 391, 23 in a vertical direction by 17 in a horizontal direction. That is, in the fly-eye lens 12, 391 lens cells were arranged in a matrix of a square area of 64.4 mm long by 61.9 mm wide, in such a manner as to align linearly in the vertical direction (row direction) and the horizontal direction (line direction).

In this simulation, illumination light was entered into the fly-eye lenses 12 in such a manner that the central position of the intensity distribution shown in FIG. 2A (position of x=0 and y=0) was aligned with a central position in the arrangement area of lens cells in the fly-eye lens 12 (square area of 64.4 mm long by 61.9 mm wide). In addition, a position in the intensity distribution at which the direction of the horizontal axis (x axis) shown in FIG. 2A was parallel to the horizontal direction (line direction) of the fly-eye lenses 12, was set as a reference position (rotation angle=0°). The intensity distribution was rotated from the reference position in a clockwise direction, and illuminance non-uniformity in illumination light on the liquid crystal panel 16 was determined at each rotated position by an optical simulation.

Figure 3:
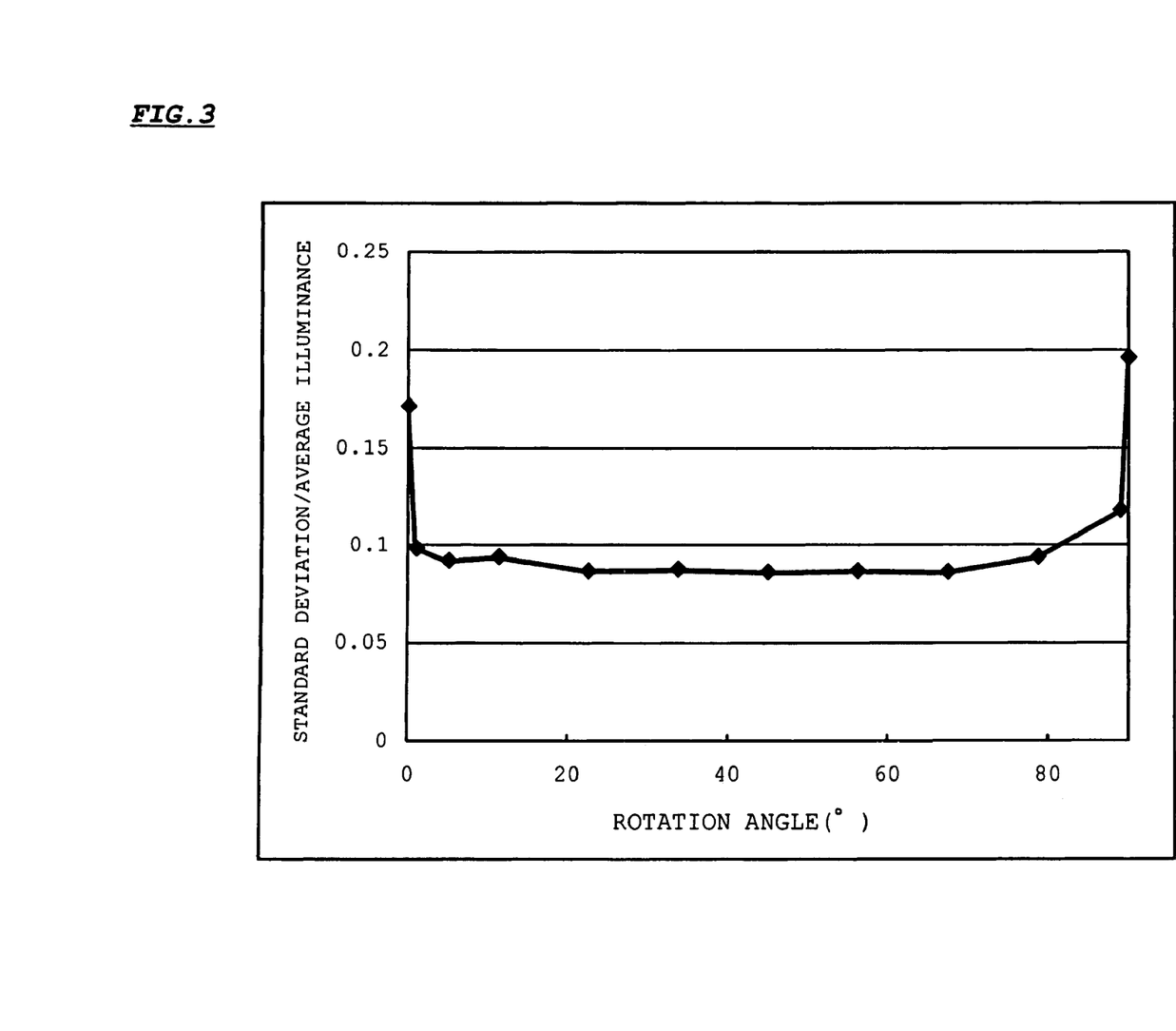
FIG. 3 shows results of the simulation of the embodiment.

FIG. 3 illustrates results of the simulation. The horizontal axis indicates a rotation angle of the intensity distribution of illumination light, and the vertical axis indicates illuminance non-uniformity in illumination light on the liquid crystal panel 16. Here, as an evaluation value of illuminance non-uniformity, an average deviation of illuminance shown below was used.

Average deviation=a standard deviation of illuminance on the liquid crystal panel 16/an average illuminance in the overall area on the liquid crystal panel 16

With reference to the simulation results shown in FIG. 3, it can be seen that illuminance non-uniformity was reduced by rotating the intensity distribution from the reference position. In addition, when the intensity distribution is rotated 90 degrees from the reference position, a direction in which the intensity distribution is uniform (the x-axis direction shown in FIG. 2A) is aligned with the vertical direction (row direction) of the fly-eye lens 12. With reference to FIG. 3, it can be found that such rotation of the intensity distribution by 90 degrees has brought about deteriorated illuminance non-uniformity. This is because, when the intensity distribution is rotated 90 degrees from the reference position, the intensity distribution of light incident on the fly-eye lens 12 becomes approximately uniform in the vertical direction (row direction), illumination light in almost the same pattern is entered into the lens cells aligned in the row direction. More specifically, when illumination light is entered in such a manner, the number of patterns of laser light superimposition by the lens cells is decreased as in the case shown in FIG. 1B, and as a result, illuminance non-uniformity in illumination light on the liquid crystal panel 16 is deteriorated.

As described above, this simulation has proven that illuminance non-uniformity in illumination light on the liquid crystal panel 16 can be reduced by inclining a direction in which the intensity distribution is uniform, with respect to the arrangement direction of the lens cells in the fly-eye lenses 12. Therefore, by inclining the arrangement direction of the laser light sources 11 with respect to the horizontal direction (line direction) or vertical direction (row direction) of the fly-eye lenses 12, it is possible to enhance the effectiveness of illumination light superimposition by the fly-eye lenses 12, thereby suppressing illuminance non-uniformity in illumination light on the liquid crystal panel 16.

CONFIGURATION EXAMPLE 1

Figure 4:
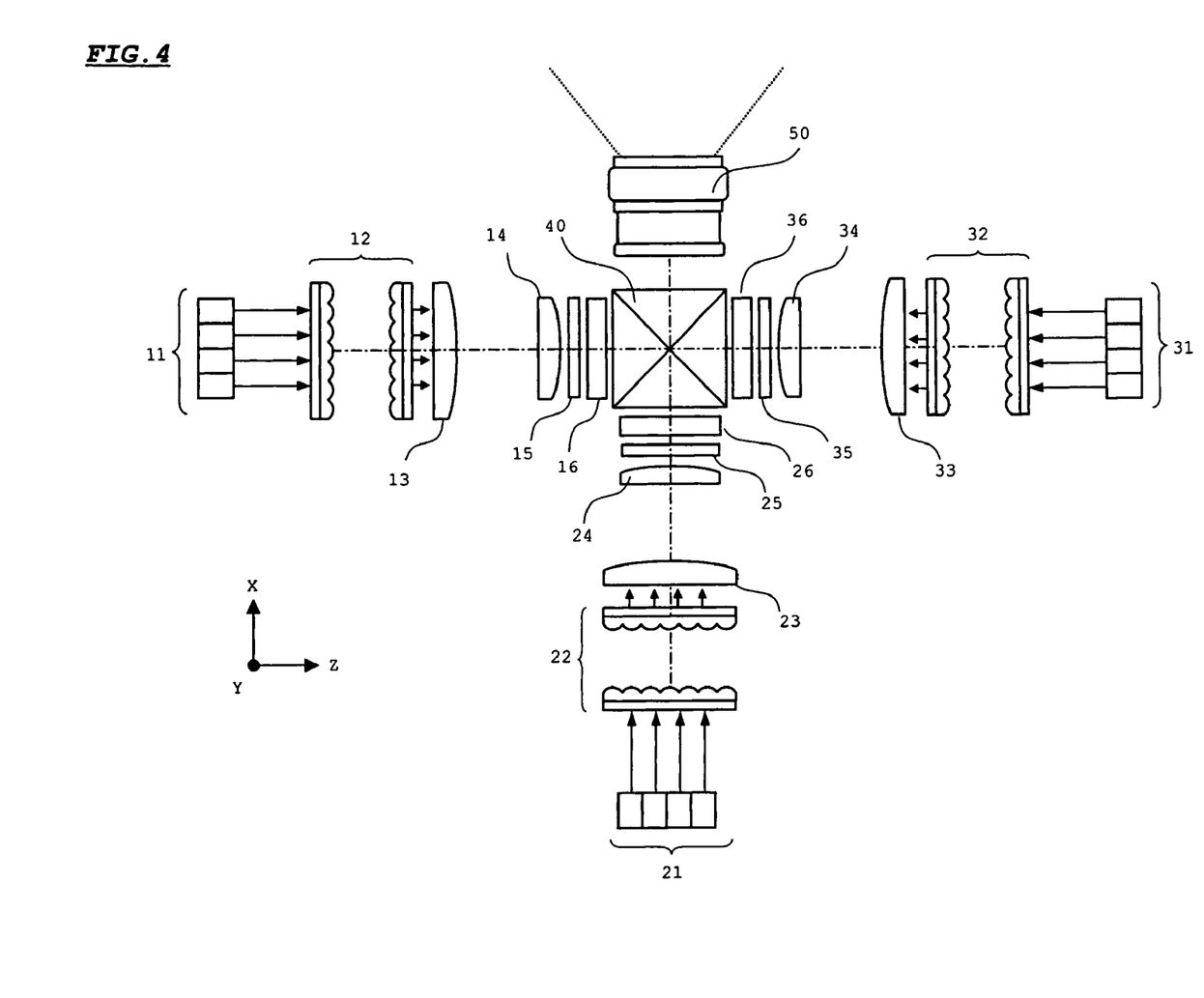
FIG. 4 shows a more specific configuration example of an optical system in the embodiment.

FIG. 4 illustrates a more specific configuration example of the foregoing embodiment.

In the diagram, an optical system covering from the laser light sources 11 to the liquid crystal panel 16 is identical to the basic configuration shown in FIG. 1A and 1C. The laser light sources 11 emit laser light with a red wavelength band (hereinafter referred to as "R light"), for example. Although the diagram shows four laser light sources 11, the number of the laser light sources 11 are not limited to four and may be altered as appropriate.

The laser light sources 11 are linearly arranged and arrayed in such a manner that the arrangement direction thereof is inclined with respect to the line direction of the fly-eye lenses 12, as stated above with reference to FIGS. 1A and 1C.

The R light emitted from the laser light sources 11 is entered into a pair of fly-eye lenses 12. After passing through lens cells in the fly-eye lenses 12, the R light goes through the condenser lenses 13 and 14 and the half-wavelength plate 15, and then is superimposed on the incident plane of the liquid crystal panel 16. In the superimposed R light, illuminance non-uniformity is suppressed as described above with regard to the foregoing embodiment. In addition, the R light incident on the liquid crystal panel 16 is adjusted by the half-wavelength plate 15 such that the polarization direction thereof is adapted to the liquid crystal panel 16.

An optical system covering from laser light sources 21 to a liquid crystal panel 26 is an optical system for laser light with a green wavelength band (hereinafter referred to as "G light"). A configuration of the optical system is identical to the basic configuration shown in FIGS. 1A and 1C.

The laser light sources 21 are linearly arranged and arrayed such that an arrangement direction thereof is inclined with respect to a line direction of fly-eye lenses 22 as described above with regard to the foregoing embodiment. The laser light sources 21 each emit G light in such a manner that a longer beam axis direction is perpendicular to the arrangement direction of the laser light sources 21.

The G light emitted from the laser light sources 21 is entered into a pair of fly-eye lenses 22. After passing through lens cells in the fly-eye lenses 22, the G light goes through condenser lenses 23 and 24 and a half-wavelength plate 25, and then is superimposed on an incident plane of the liquid crystal panel 26. In the superimposed G light, illuminance non-uniformity is suppressed as described above with regard to the foregoing embodiment. In addition, the G light incident on the liquid crystal panel 26 is adjusted by the half-wavelength plate 25 such that the polarization direction thereof is adapted to the liquid crystal panel 26.

An optical system covering from laser light sources 31 to a liquid crystal panel 36 is an optical system for laser light with a blue wavelength band (hereinafter referred to as "B light"). A configuration of the optical system is identical to the basic configuration shown in FIG. 1.

The laser light sources 31 are linearly arranged and arrayed such that an arrangement direction thereof is inclined with respect to a line direction of fly-eye lenses 32 as described above with regard to the foregoing embodiment. The laser light sources 31 each emit B light in such a manner that a longer beam axis direction is perpendicular to the arrangement direction of the laser light sources 31.

The B light emitted from the laser light sources 31 is entered into a pair of fly-eye lenses 32. After passing through lens cells in the fly-eye lenses 32, the G light goes through condenser lenses 33 and 34 and a half-wavelength plate 35, and then is superimposed on an incident plane of a liquid crystal panel 36. In the superimposed B light, illuminance non-uniformity is suppressed as described above with regard to the foregoing embodiment. In addition, the B light incident on the liquid crystal panel 36 is adjusted by the half-wavelength plate 35 such that the polarization direction thereof is adapted to the liquid crystal panel 36.

The R, G and B lights are entered via incident-side polarizers (not shown) into the liquid crystal panels 16, 26 and 36, respectively. The R, G and B lights are modulated by the liquid crystal panels 16, 26 and 36, respectively, and then are entered into a dichroic prism 40 via output-side polarizer (not shown).

The R, G and B lights are combined at the dichroic prism 40, and the combined light is entered into a projection lens 50. The projection lens 50 includes: a group of lenses for forming an image with projection light on a projection plane; and an actuator for displacing some of the group of lenses in the direction of the light axis to adjust zoom and focus states of a projected image.

According to this configuration example, illuminance non-uniformity in illumination light is reduced on the incident planes of the liquid crystal panels 16, 26 and 36, and therefore it is possible to suppress an unevenness of a projected image.

Further, a conventional optical system in FIG. 4 may have half-wavelength plates disposed at placement positions of the half-wavelength plates 15 and 25 to thereby optimize reflection characteristics of R and B lights with respect to the dichroic prism 40. In this case, if the laser light sources 11 and 31 are linearly arranged in such a manner that the arrangement direction thereof is inclined with respect to the line direction of the fly-eye lenses 12 and 32 as in this configuration example, this inclination causes polarization directions of the R and B lights with respect to the half-wavelength plates to be inclined from correct directions. Therefore, it is necessary to correct such inclinations of the polarization directions.

Although the inclinations of the polarization directions may be corrected by adding the half-wavelength plates 15 and 25 as in the above configuration example, it is desired that the correction be made by adjusting appropriately optical axes of the originally provided half-wavelength plates for R and B lights, for the sake of reducing the parts count. More specifically, the optical axes of the half-wavelength plates may be aligned in directions that halve inclination angles of the polarization directions of the R and B lights with respect to the correct directions.

The directions of the optical axes may be adjusted by placing the half-wavelength plates in which directions of the optical axes have been corrected in advance according to a relationship between the R and B lights, at desired positions in light paths. Alternatively, if fine adjustments are needed, the half-wavelength plates may be arranged in the light paths and then rotated around the light axes.

In such a conventional optical system, no half-wavelength plate is disposed in the light path of G light. This is because, since G light transmits through the dichroic prism 40, an optimum transmission property with respect to the dichroic prism 40 can be obtained without making particular adjustments to the polarization direction. In this configuration example, however, the laser light sources 21 are linearly arranged in such a manner that the arrangement direction thereof is inclined with respect to the line direction of the fly-eye lenses 22, and thus this inclination causes the polarization direction of G light to be inclined from a correct direction. Therefore, it is necessary to arrange the separate half-wavelength plate 25 for G light to conform the polarization direction to the correct direction, as in the foregoing configuration example.

If the polarization direction is adjusted in such a manner, the polarization directions of color lights are optimized with respect to the dichroic prism 40 and also optimized with respect to the liquid crystal panels 16, 26 and 36. More specifically, the liquid crystal panels 16, 26 and 36 are configured in such a manner that, when the polarization directions of R, G and B lights are optimized with respect to the dichroic prism 40, these R, G and B lights enter in the optimum polarization directions into the liquid crystal panels 16, 26 and 36.

As the foregoing, embodiments of the present invention and a specific configuration example of a projector are described. However, the present invention is not limited by these embodiments and configuration. Embodiments of the present invention may be modified in various manners other than the foregoing ones.

For example, the laser light sources 11, 21 and 31 may be arranged in two or more tiers, instead of one tier.

Figure 5A:
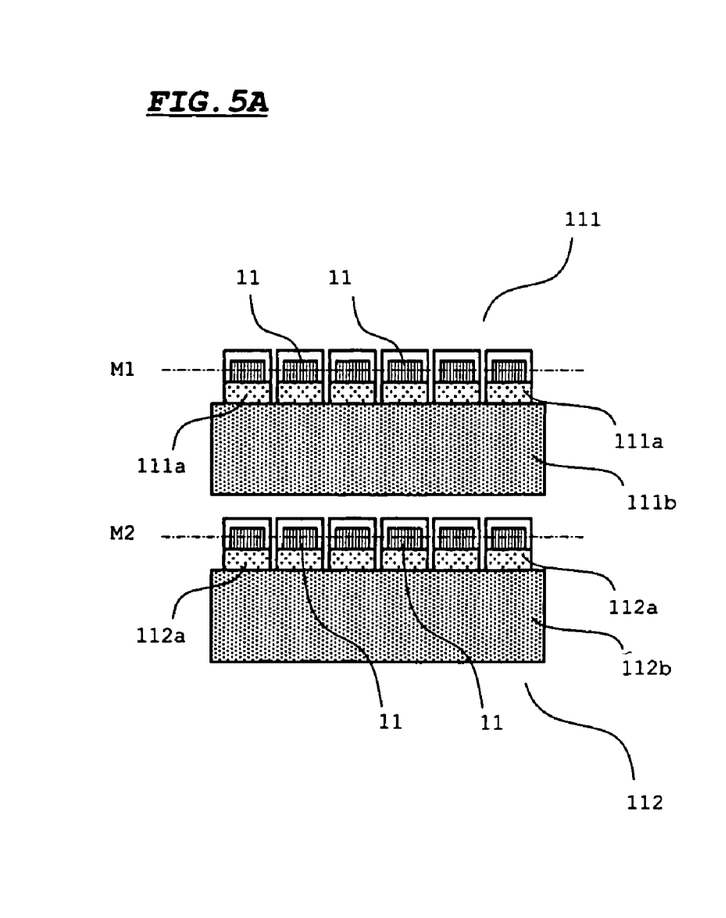
FIGS. 5A and 5B are diagrams showing a modification of the configuration example (modification of a light source part)
Figure 5B:
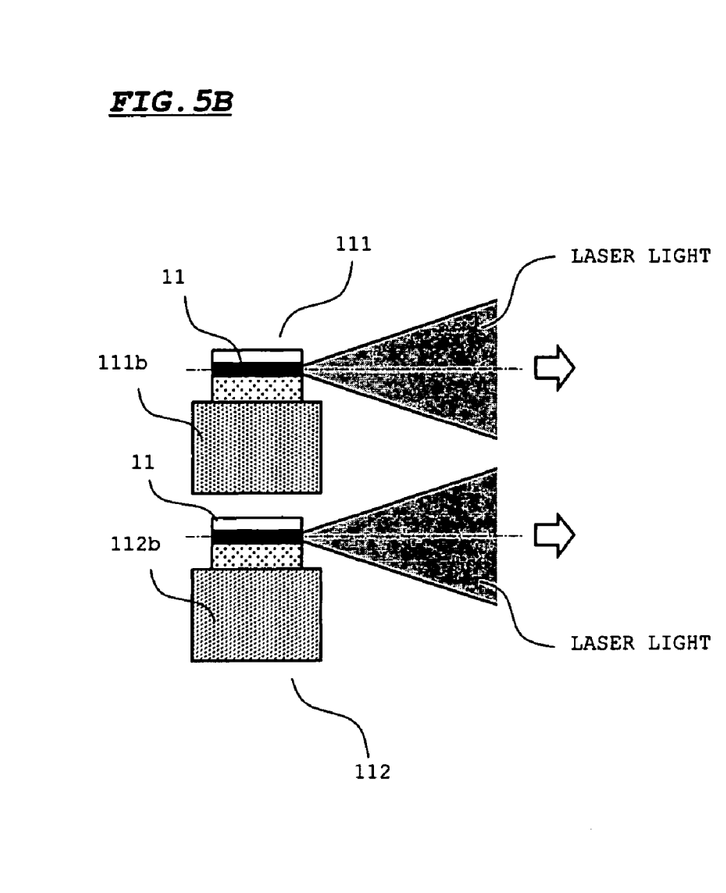

FIG. 5 illustrates a configuration example in which a plurality of laser light sources 11 are arranged in two tiers. FIGS. 5A and 5B are front and side views of laser arrays 111 and 112, respectively. In this arrangement, the laser light sources 11 (laser elements) are formed and arrayed on substrates 111a and 112a in such a manner that light emission parts thereof are linearly aligned. The substrates 111a and 112a are attached to cooling members 111b and 112b. The laser arrays 111 and 112 including the laser light sources 11, the substrates 111a and 112a, and the cooling members 111b and 112b, are held by a holding member (not shown) in such a manner that the light emission parts of the laser light sources 11 in the tiers are aligned on two parallel straight lines M1 and M2 positioned on a plane vertical to axes of outgoing light.

Figure 6A:
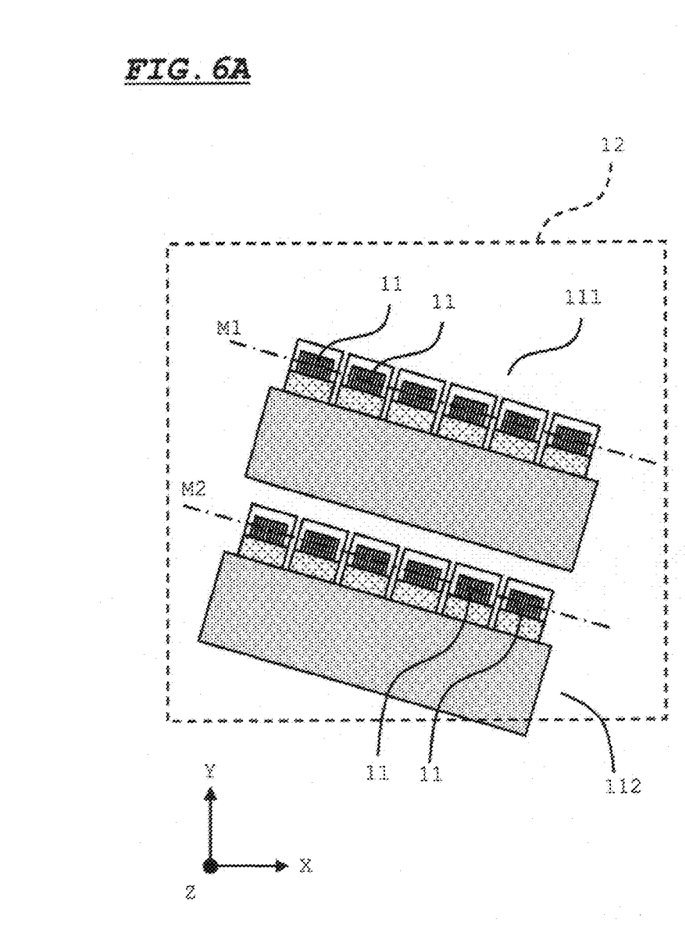
FIGS. 6A and 6B show photographs of positional relationships between laser light sources and a fly-eye lens in the foregoing modification.

FIG. 6A illustrates a positional relationship between the laser arrays 111 and 112 and the fly-eye lens 12. As shown in the diagram, the laser arrays 111 and 112 are arranged in such a manner that the arrangement directions of the laser light sources 11 (the straight lines M1 and M2) are inclined at a specific angle with respect to the line direction of the fly-eye lenses 12 (X-axis direction).

Figure 6B:
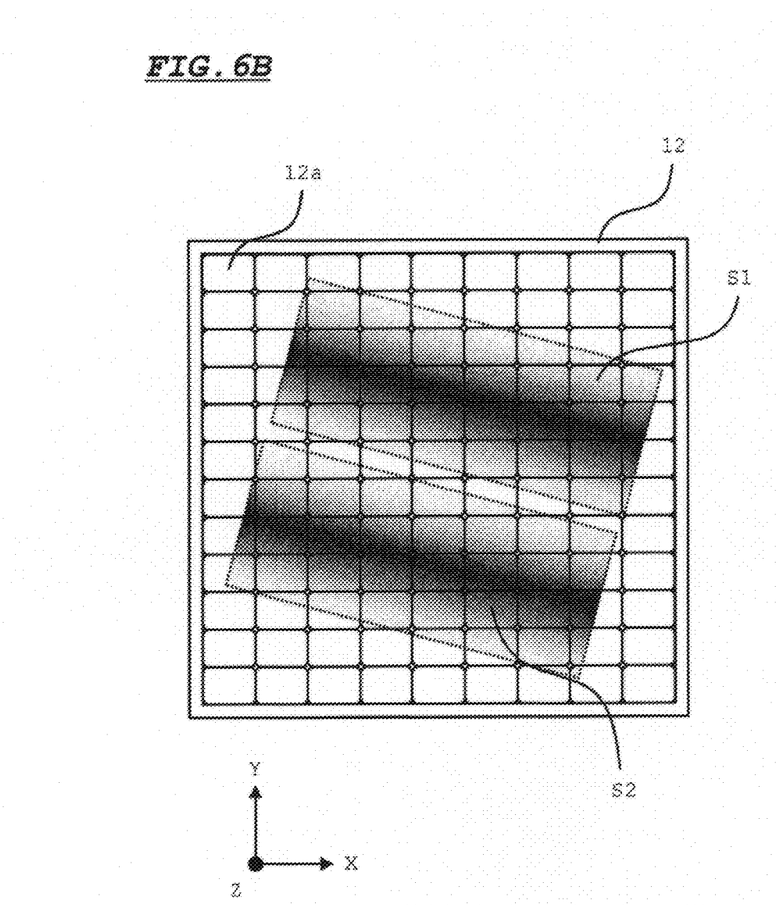

FIG. 6B illustrates intensity distributions of laser light (R light) on the fly-eye lens 12 when the laser light sources 11 are lit. In the diagram, reference numerals S1 and S2 denote intensity distributions of laser light emitted from the laser arrays 111 and 112, respectively. Reference numeral 12a denotes a lens cell.

In this case, similarly, the number of patterns of superimposition by the fly-eye lens 12 can be significantly increased, as compared with a case where the straight lines M1 and M2 are parallel to the X axis. Accordingly, it is possible to significantly enhance the effectiveness of illumination light superimposition by the fly-eye lens 12, thereby suppressing illuminance non-uniformity in illumination light.

Further, the modifications shown in FIGS. 5A, 5B, 6A and 6B are applicable to the laser light sources 21 and 31 as well as the laser light sources 11 shown in FIG. 4. In addition, although FIGS. 5A, 5B, 6A and 6B describe configurations in which the laser arrays are arranged in two stages in which the laser light sources 11 are placed in two tiers, the stages of laser arrays may be increased so that the laser light sources 11 can be arranged in three or more tiers.

Figure 7:
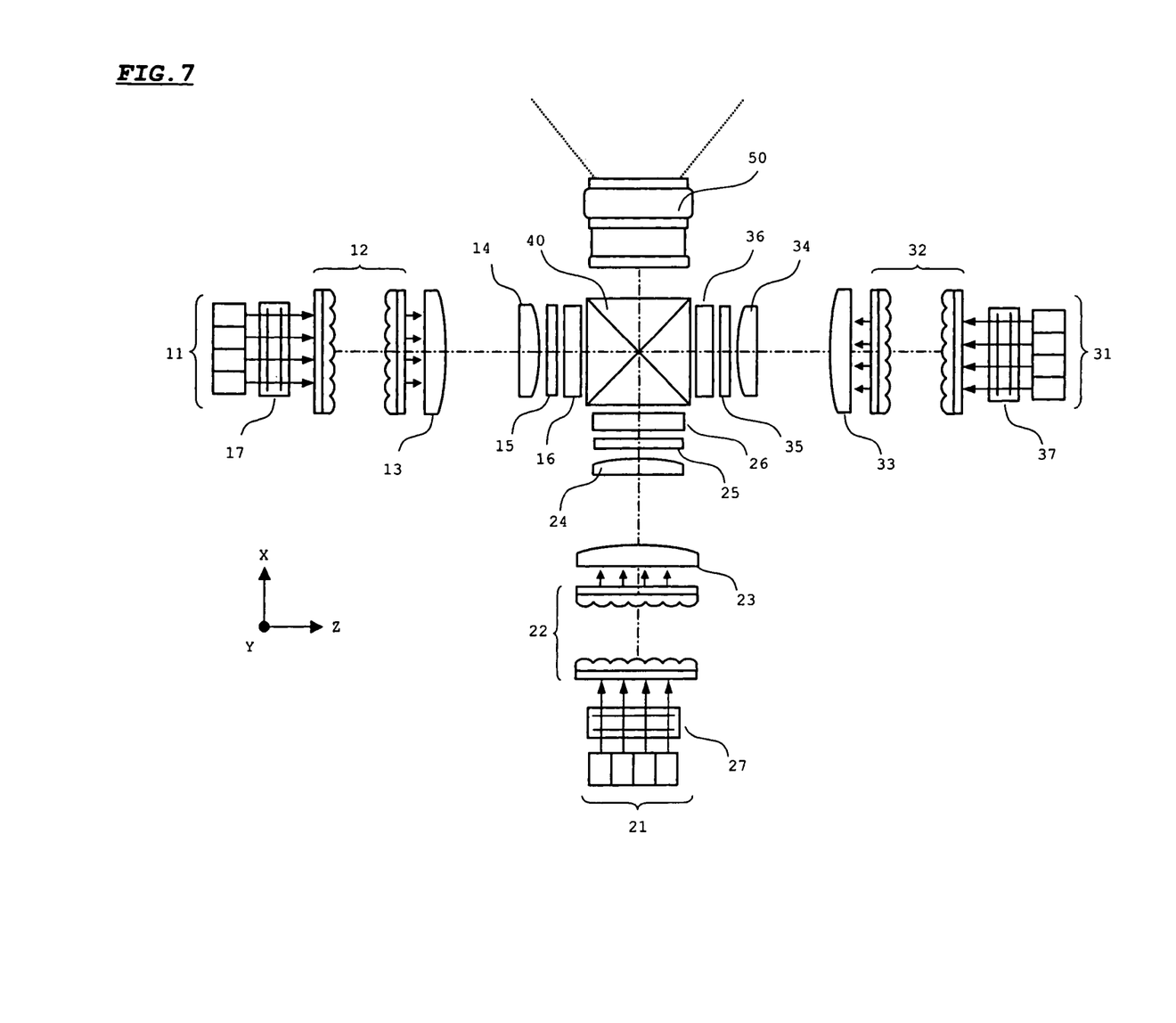
FIG. 7 shows another modification of the configuration example (modification with additional cylindrical lenses)

In the foregoing configuration examples, laser light emitted from the laser light sources 11, 21 and 31 is entered directly into the fly-eye lenses 12, 22 and 32. Alternatively, as shown in FIG. 7, landscape cylindrical lenses 17, 27 and 37 may be arranged between the laser light sources 11, 21 and 31 and the fly-eye lenses 12, 22 and 32, so that laser light emitted from the laser light sources 11, 21 and 31 are converged in the longer beam axis direction, converted into parallel light, and then entered into the fly-eye lenses 12, 22 and 32. In this case, the cylindrical lenses 17, 27 and 37 are inclined with respect to the line directions (X-axis directions) of the fly-eye lenses 12, 22 and 32, as in the case with the laser light sources 11, 21 and 31.

Figure 8:
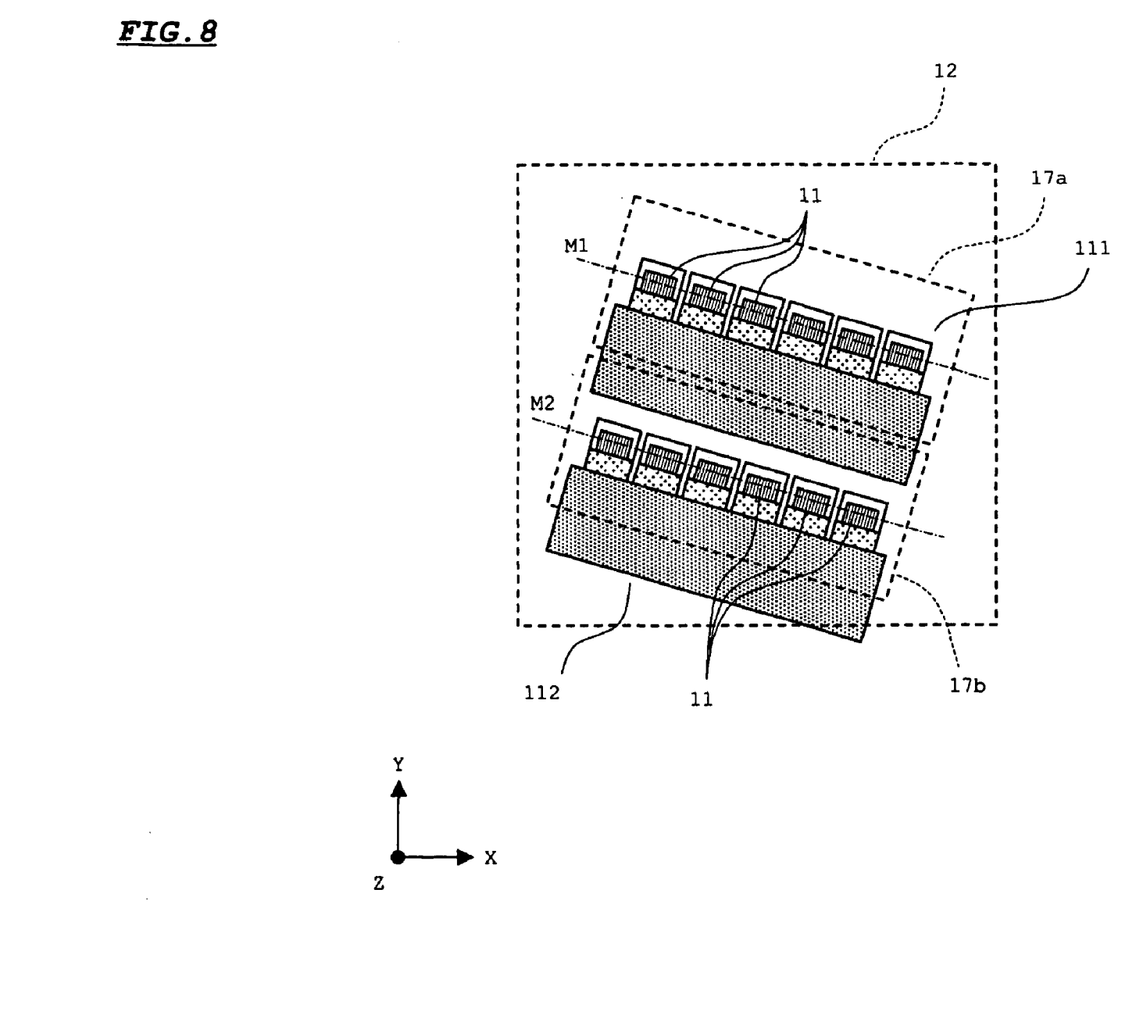
FIG. 8 shows a positional relationship between laser light sources and a fly-eye lens in the modification shown in FIG. 7.

FIG. 8 illustrates positional relationships among the laser arrays 111 and 112 with the laser light sources 11 in two tiers, cylindrical lenses 17a and 17b, and the fly-eye lens 12. The cylindrical lenses 17a and 17b are arranged in correspondence with the laser arrays 111 and 112, respectively.

As in the case shown in FIG. 6A, the laser arrays 111 and 112 are arranged in such a manner that the arrangement directions (the straight lines M1 and M2) of the laser light sources 11 are inclined at a specific angle with respect to the line direction (X-axis direction) of the fly-eye lens 12. In addition, the cylindrical lenses 17a and 17b are arranged in such a manner that long sides thereof are inclined at a specific angle with respect to the line direction (X-axis direction) of the fly-eye lens 12, as in the arrangement of the laser light sources 11. The laser light sources 11 each emit laser light in such a manner that the longer beam axis direction is vertical to the arrangement directions (the straight lines M1 and M2) of the laser light sources 11. The cylindrical lenses 17a and 17b converge the laser light in the longer beam axis direction to convert the same into parallel light.

Although, in this arrangement, the landscape cylindrical lenses 17a and 17b are used to convert laser light into parallel light, one cylindrical lens may be provided for a predetermined number of laser light sources. Alternatively, an additional lens system may be further provided to converge laser light not only in the longer beam axis direction but also in a direction of the shorter axis of the beam for conversion into parallel light.

Moreover, a diffraction grating may converge laser light for conversion into parallel light. In this case, a slit-type diffraction grating and a blazed diffraction grating can be used, for example. These diffraction gratings have diffraction patterns for converging and converting laser light into parallel light.

Besides, in the configuration examples shown in FIGS. 1, 4 and 7, the half-wavelength plates 15, 25 and 35 are placed between the condenser lenses 14, 24 and 34 and the liquid crystal panels 16, 26 and 36. However, the placement positions of the half-wavelength plates 15, 25 and 35 are not limited to the foregoing, and the half-wavelength plates 15, 25 and 35 may be placed at any positions in the light paths between the laser light sources 11, 21 and 31 and the liquid crystal panels 16, 26 and 36.

Although the liquid crystal panels 16, 26 and 36 are used as imagers in the foregoing arrangements, the present invention are also applicable to projectors using other imagers such as a DMD (digital micro-mirror device: DLP-system imager manufactured by the US company TI).

Figure 9:
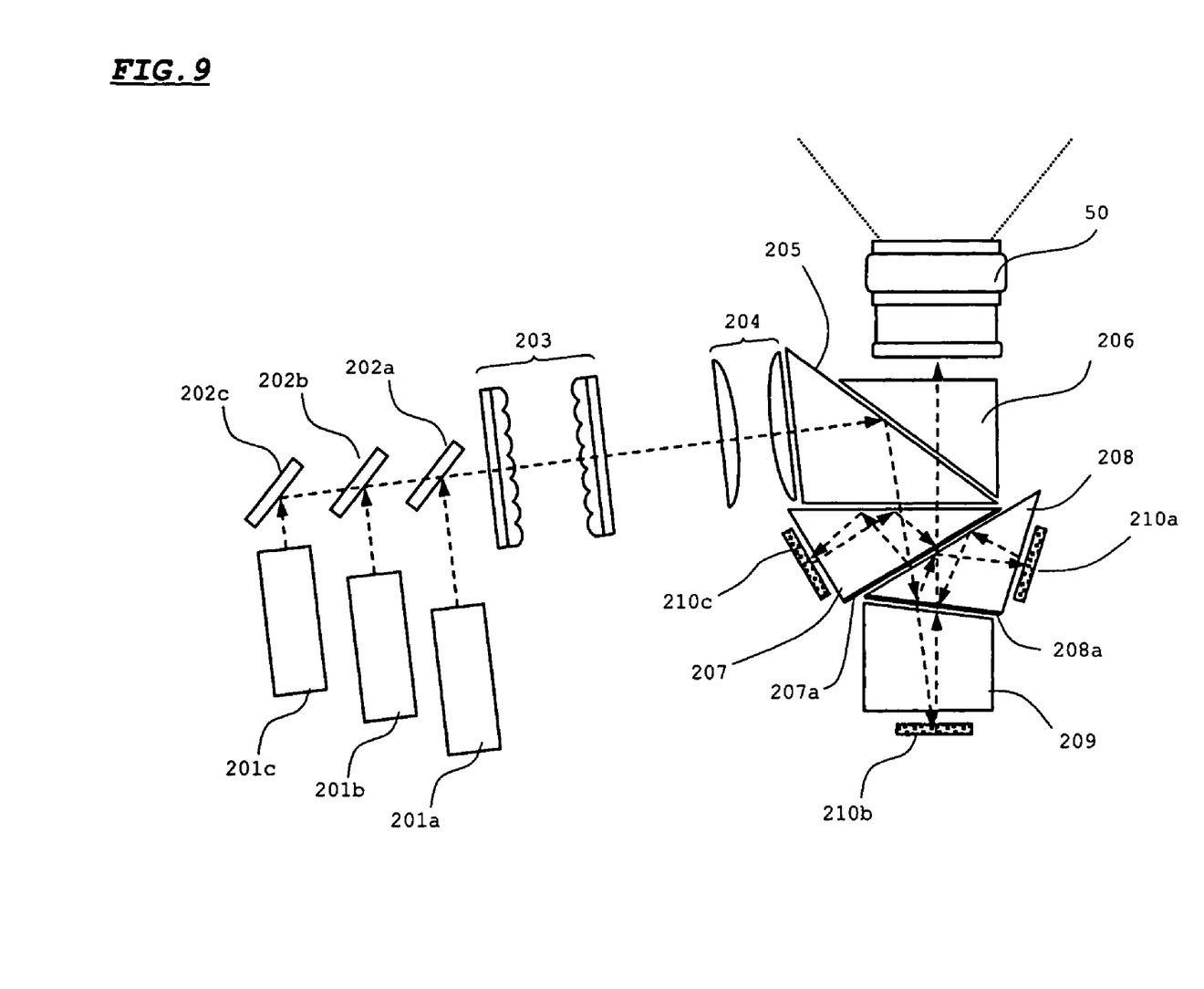
FIG. 9 is a diagram showing another modification of the configuration example (modification of an optical system using DMDs).

FIG. 9 illustrates a configuration example of an optical system using DMDs as imagers.

In the diagram, reference numerals 201a, 201b and 201c denote laser arrays in which laser light sources emitting R, G and B lights are linearly placed, respectively. In this arrangement, the laser light sources may be disposed in one or more tiers.

Laser light emitted from the laser arrays 201a, 201b and 201c is reflected by dichroic mirrors 202a and 202b and a mirror 202c, respectively, and then combined into white light. The combined white light is entered into fly-eye lenses 203, and then entered into a prism 205 via condenser lenses 204.

The laser arrays 201a, 201b and 201c, as described above, are disposed as to enter R, G and B lights into the fly-eye lenses 203 such that directions in which intensity distributions of laser light (arrangement directions of the laser light sources) are inclined at a predetermined angle with respect to the line direction or row direction of lens cells.

After having entered into the prism 205, the white light is totally reflected by a side surface of the prism 205 at a boundary between the prism 205 and a prism 206 (hereinafter, such a side surface of a component opposite to a side surface of the other component with an air gap therebetween will be referred to as "air gap surface"), and is guided into a prism 207. In the white light having entered into the prism 207, B light is reflected by a dichroic filter plane 207a disposed on an emission surface of the prism 207, and R and G lights are entered into a prism 208. After having entered into the prism 208, the R light is reflected by a dichroic filter plane 208a disposed on an emission surface of the prism 208, and the G light is entered into a prism 209.

After having been reflected by the dichroic filter plane 207a, the B light is totally reflected by an air gap surface of the prism 207 opposite to a side surface of the prism 205, entered into a B-DMD 210c as an imager for B light, and then modulated in accordance with a video signal for B light. After having been reflected by the dichroic filter plane 208a, the R light is totally reflected by an air gap surface of the prism 208 opposite to a side surface of the prism 207, entered into an R-DMD 210a as an imager for R light, and then modulated in accordance with a video signal for R light. After having been entered into the prism 209, the G light is entered into a G-DMD 210b as an imager for G light, and then modulated in accordance with a video signal for G light.

The G light modulated by the G-DMD 210b passes sequentially through the prisms 208, 207, 205 and 206, and guided into a projection lens 50. The R light modulated by the R-DMD 210a is totally reflected by the air gap surface of the prism 208 opposite to the side surface of the prism 207, further reflected by the dichroic filter plane 208a, passes sequentially through the prisms 207, 205 and 206, and then is guided into the projection lens 50. The B light modulated by the B-DMD 210c is totally reflected again by the air gap surface of the prism 207 opposite to the prism 205, further reflected by the dichroic filter plane 207a, passes sequentially through the prisms 205 and 206, and then is guided to the projection lens 50.

As described above, in an optical system of this type, white incident light is repeatedly subjected to reflection and total reflection in prisms, divided into R, G and B lights, and then guided into corresponding DMDs. After having been modulated by these imagers, the divided lights are repeatedly subjected to reflection and total reflection in the prisms, combined into image light, and then projected onto a screen (not shown) via the projection lens 50.

In the configuration example shown in FIG. 9, DMDs are used as imagers and therefore it is not necessary to adjust the polarization directions of R, G and B lights with respect to the imagers. Therefore, in this configuration example, there is no need for provision of the half-wavelength plates 15, 26 and 36, unlike in the configuration example shown in FIG. 7, thereby reducing the parts count. Besides, embodiments of the present inventions may be changed in various manners as appropriate, within a scope of technical ideas defined in the claims.

What is claimed is:

1. An illumination device, comprising:
   a light source part for emitting light with an intensity distribution approximately uniform in a first direction; and
   a fly-eye lens into which the light is entered, wherein
   the light source part and the fly-eye lens are arranged such that the first direction is inclined with respect to vertical and horizontal directions of arrangement of lens cells in the fly-eye lens.

2. An illumination device according to claim 1, wherein
   the light source part has a plurality of laser light sources arranged in the first direction.

3. An illumination device according to claim 2, wherein
   the plurality of laser light sources are mutually identical in a direction of polarization,
   and the illumination device further comprising:
   a polarization rotation element to rotate a polarization direction of the light having passed through the fly-eye lens so as to be adapted to the imager.

4. An illumination device according to claim 3, wherein
   the polarization rotation element is a half-wavelength plate.

5. A projection display device comprising:
   an illumination device; and
   an imager irradiated with light from the illumination device, wherein
   the illumination device includes:
   a light source part for emitting light with an intensity distribution approximately uniform in a first direction; and
   a fly-eye lens into which the light is entered, wherein
   the light source part and the fly-eye lens are arranged such that the first direction is inclined with respect to vertical and horizontal directions of arrangement of lens cells in the fly-eye lens.

6. A projection display device according to claim 5, wherein
   the light source part has a plurality of laser light sources arranged in the first direction.

7. A projection display device according to claim 6, wherein
   the plurality of laser light sources are mutually identical in a direction of polarization,
   and the projection display device further comprising:
   a polarization rotation element to rotate a polarization direction of the light having passed through the fly-eye lens so as to be adapted to the imager.

8. A projection display device according to claim 7, wherein
   the polarization rotation element is a half-wavelength plate.

* * * * *